United States Patent [19]

Nakai et al.

[11] 3,899,659

[45] Aug. 12, 1975

[54] MAGNETIC CARD READER

[75] Inventors: Siyunzi Nakai, Moriguchi; Masazumi Nakarai, Kyoto, both of Japan

[73] Assignee: Sharp Kabushiki Kaisha, Osaka, Japan

[22] Filed: Aug. 24, 1973

[21] Appl. No.: 391,468

[30] Foreign Application Priority Data

Aug. 25, 1972 Japan ............................ 47-85497

[52] U.S. Cl. ..... 235/61.11 D; 235/61.11 R; 271/19; 360/2

[51] Int. Cl.[2] ............... G06K 7/08; G06K 13/103; B65H 3/30; G11B 25/04

[58] Field of Search .............. 271/13, 19, 248, 250; 235/61.11 E, 61.11 D, 61.11 B, 61.11 C, 61.7 B, 61.11 R; 340/149 A; 360/2, 131; 226/90

[56] References Cited

UNITED STATES PATENTS

| | | | |
|---|---|---|---|
| 2,249,505 | 7/1941 | Davidson | 271/13 |
| 3,084,931 | 4/1963 | Hanson | 271/250 |
| 3,330,458 | 7/1967 | Bentzman | 226/90 |
| 3,424,454 | 1/1969 | Treff | 271/19 |
| 3,470,358 | 9/1969 | Sallach | 235/61.11 C |
| 3,562,495 | 2/1971 | Grippi | 235/61.11 A |
| 3,586,790 | 6/1971 | Guttinger | 360/2 |
| 3,629,556 | 12/1971 | Orzechowski | 235/61.11 B |

*Primary Examiner*—Daryl W. Cook
*Assistant Examiner*—Robert M. Kilgore
*Attorney, Agent, or Firm*—Stewart and Kolasch, LTD.

[57] ABSTRACT

The present disclosure is directed to a magnetic credit card reader wherein an upper frame carrying a drive roller-containing transport mechanism for transporting a magnetic card is rotatably secured with the use of a spring in a manner to allow modification of the relative position thereof with respect to a lower frame disposed at a fixed position. With such arrangement, the magnetic card can be transported under pressure of substantially the same value irrespective of the thickness of the magnetic card during read and write operations on the card. The drive roller is stair-shaped and is made preferrably of elastic materials to provide stable transport operations.

5 Claims, 9 Drawing Figures

MAGNETIC CARD READER

BACKGROUND OF THE INVENTION

This invention relates generally to a magnetic card reader, and more particularly to an improved magnetic card reader for reading out and writing in information on a magnetizable surface of a magnetic card.

An apparatus for recording information on and reading information from a magnetic card is required to read out accurately very small differences in magnetic characteristics on the magnetizable surface and translate them into electric signals. In order to enhance the reading accuracy, a magnetic head for detecting the magnetic variations is positioned as close to the magnetizable surface of the card as possible. For example, a drive roller of rigid material and a spring pressing down the drive rollers are provided to afford to the magnetic card a pressing force effective to maintain the record surface of the magnetic card in contact with the magnetic head. Moreover, an additional roller of elastic material is provided to cause the magnetic card to engage between the drive roller and the additional roller.

However, credit cards on which some kinds of information are printed or recorded have printed or recorded names or numbers on the face and coated magnetic materials on the rear or the edge of the face. One or the other of the rollers contacts necessarily the surface of the card as the card passes between the rollers and, therefore, there is a possibility of gradually erroding the printed record on the card because the card is introduced into and ejected from the system many times.

In addition, the spacing between the rollers for insertion of the card is fixed and, in the case of change in thickness of the card used with the system, the card-pressing force will vary above or below the desired pressure value. In particular, a type of the reader system wherein the drive roller faces and contacts the magnetic head is adversely influenced by these variations. Where the card is thicker than the normal or standard size, the card-pressing force will increase and then abrasion of the magnetic head and card surface is markedly expediated. Conversely, where the card is thinner than the same the card-pressing force becomes insufficient for the transport of the cards and accordingly the cards may slip off or travel on the skew. For these reasons, no stable and reliable operations of reading and writing information can be ensured.

The prior art card positioning arrangement, as illustrated in IBM Technical Disclosure Bulletin, vol. 13, No. 15, 1970, p. 1141, utilizes a spring to force the side edge of the card to a guide, the record card being positioned along the guide. The edge portion of the card, however, will be damaged due to the pressure acting on the side edge of the card.

OBJECTS AND SUMMARY OF THE INVENTION

Accordingly, a first object of the invention is the provision of a magnetic card reader wherein a magnetic record surface of a card is allowed to contact a magnetic head under substantially the same pressure irrespective of thickness of the card thereby to avoid the disadvantages of the prior art.

A second object of the invention is the provision of a magnetic credit card reader wherein an upper frame is movably attached to a stationary lower frame so that a drive roller deposited on the upper frame can be shifted upward and downward with respect to a magnetic head within the lower frame.

The third object of the invention is the provision of a magnetic card reader wherein an upper frame is movably attached to a lower frame through a hinge means thereby to facilitate maintenance, repair and clearance of various components and elements.

A fourth object of the invention is the provision of a magnetic card reader wherein a drive roller for feeding a card is positioned closely adjacent to a magnetic head so that a card can be passed between the drive roller and the magnetic head to prevent disappearance of print patterns on the card surface.

A fifth object of the invention is the provision of a magnetic card reader utilizing a pair of drive rollers having different diameters for travelling a card along a guide at a fixed rate without damaging the peripheral edge of the card.

A sixth object of the invention is the provision of a magnetic card reader wherein a photoelectric switch is provided on a transport path of a card to control the card transport operation so that the edge of the card does not directly contact the control switch in order to preclude card damage. A seventh object of the invention is the provision of a magnetic card reader wherein a clear roller is provided adjacent to the entrance for card entry to clear the magnetic record surface of the card and protect a magnetic head.

An eighth object of the invention is the provision of a magnetic card reader wherein a guide is position-adjustably mounted with respect to a magnetic head to ensure exchangeability of the head.

In summary, according to this invention, an improved magnetic card reader is provided which utilizes a drive roller of elastic material positioned adjacent to a magnetic head for recording information on and reading information from a magnetic card. An upper frame containing a card transport mechanism is supported in a manner to allow modification of its position relative to a stationary lower frame. With such construction, read and write operations can be carried out with a fixed pressure value without regard to thickness of the magnetic card.

DESCRIPTION OF THE PREFERRED EMBODIMENTS

Figure 1:
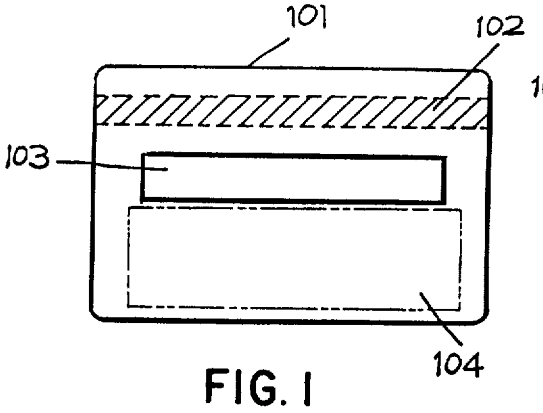
FIGS. 1 and 2 are plan and side views, respectively, of a magnetic credit card used with the invention.
Figure 2:
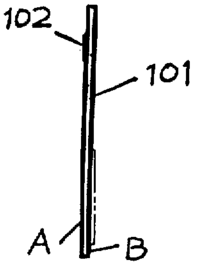

Referring now to FIGS. 1 and 2, there is illustrated a magnetic credit card 101 used with the invention. There is provided at the rear A a magnetizable record surface 102 coated with the magnetic materials, and at the face B an embossed area 104 and/or a print area 103 whereon the name of owner or the card number is described.

Figure 3:
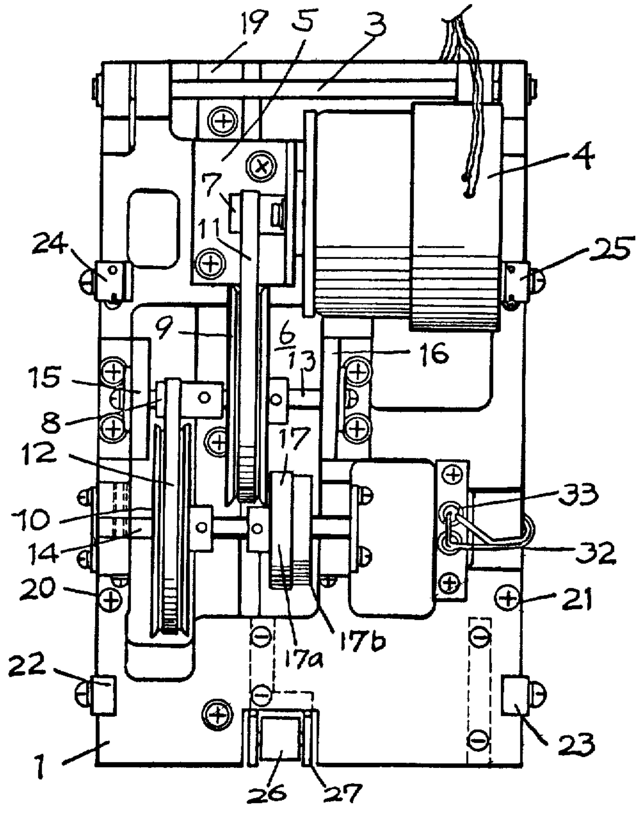
FIGS. 3 through 5 are plan, front and side views, respectively, of a card transport mechanism.
Figure 4:
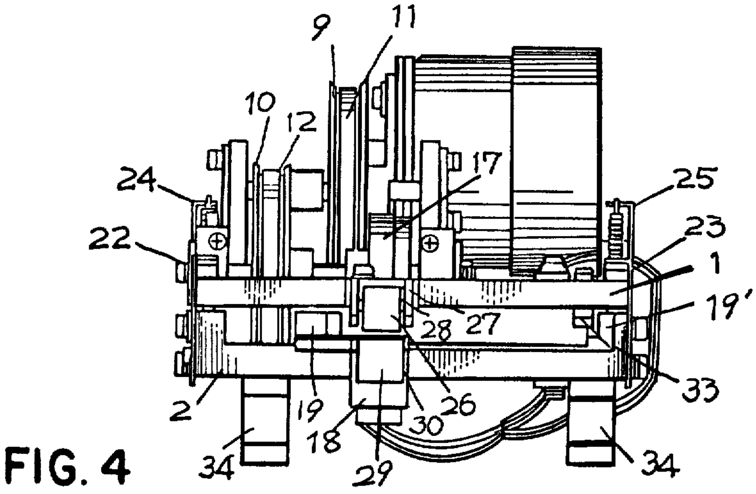
Figure 5:
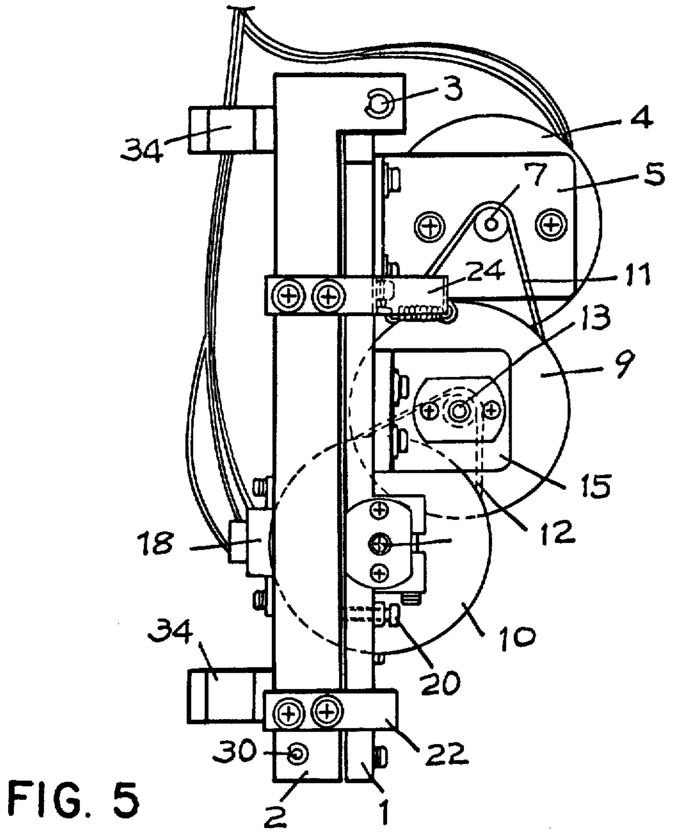

The card transport mechanism may be seen by reference to FIGS. 3 through 5 where the numeral 1 represents an upper frame or a base plate carrying a drive source system for card transport, the base plate 1 being rotatably secured at the one end thereof through a hinge shaft 3 to a lower frame 2 which is fixedly supported within the apparatus.

The drive source system mentioned above comprises a motor 4 tightly secured to the upper frame through an angle 5 or the like and a speed-reduction system 6 reducing the driving revolution of the motor 4 to a predetermined rate and transmitting such rate-reduced revolution into a drive roller 17 at its last stage. During revolution of the motor 4, a first small pulley 7 also rotates and thus the drive power is transmitted to a first large pulley 9 via a first belt 11 and further to a second small pulley 8 attached to the shaft 13 of the first large pulley 9. It is preferrable that specifically the first large pulley 9 is formed of comparatively heavy material, for example, such as iron and brass. Furthermore, the revolution of the second small pulley 8 is conveyed via a second belt 12 to a second large pulley 10 to enable rotation of a shaft 14. Bearing boxes 15, 16 are provided for accommodating bearings to support rotatably the shaft 13 therein. In the embodiment illustrated in the drawings the drive power of the motor 4 is reduced in revolution rate through the reduction system 6 deposited on the upper frame 1.

The drive roller 17 of elastic material such as rubber is tightly fixed on the shaft 10 carrying the second large pulley 10. The drive roller 17 is consisted of a large-diameter roller 17*a* and another roller 17*b* having a diameter somewhat smaller than the former 17*a* to define a stair-shaped roller alignment. It is advantageous that at least large-size roller 17*a* has elastic properties while the remaining roller 17*b* has rigid properties though the described example utilizes elastic material for both rollers 17*a*, 17*b*.

Figure 6:
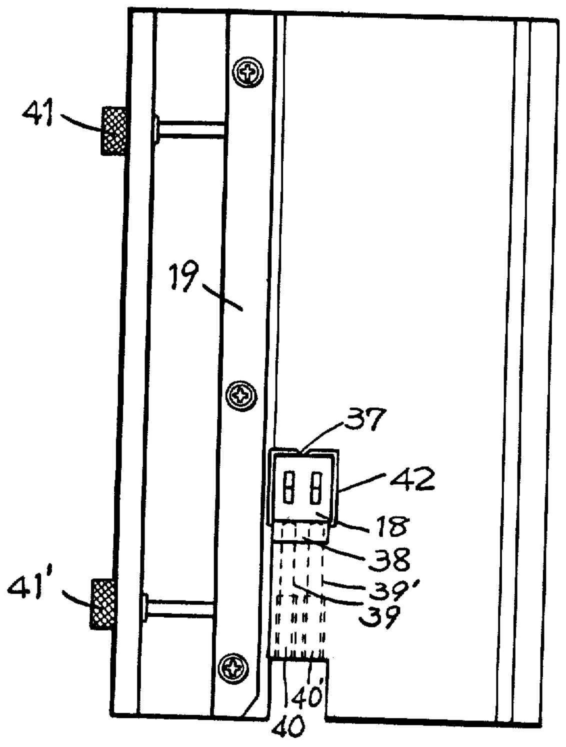
FIG. 6 is a plan view showing a lower frame in the arrangement illustrated in FIGS. 3 through 5.

A magnetic read and write head 18 is supported adjacent to the drive roller 17, which sweeps the magnetizable record surface 102 of the card as the card 101 is transported between the drive roller 17 and the magnetic head. As illustrated in FIG. 6, the magnetic head 18 is inserted into an aperture 42 formed in the lower frame 2. Such inserted magnetic head 18 is held in contact with projection 37 through two screws 40, 40′ which extend to the head 18 via a pressure plate 38 and rods 39, 39′. In this manner, the head 18 is adjustably positioned on the lower frame 2. Position adjustment is accomplished by turning the screws 40, 40′.

A guide 19 is deposited on the lower frame 2 for preventing deflection of the card movements sliding on the surface of the lower frame 2 to the right or left and thereby ensuring stable operations of card transport. The guide 19 has at least one flat plane whereon the magnetic card 101 travels. The guide 19 is also position-adjustable by means of screws 41, 41′ to provide precise positioning of the head 18 with respect to track positions within the magnetic record surface 102. In addition, it provides exchangeability for the heads of different makes.

The stair-shaped drive roller 17 affords applies to the card 101 force which causes the card to be guided by the flat plane of the guide 19 at all times during transport of the card 101. Since the drive roller 17 frictionally driving the card 101 is consists of the large diameter section 17*a* and the small-diameter section 17*b*, the amount of roller deformation is different for both the sections to provide a difference in the card-driving power. For this reason, the movements of the card 101 are influenced by revolution moment other than the driving torque exerting in the direction of card transport and such moment functions to position the card 101 along the flat plane of the guide 19. These conditions for card transport will be described with reference to FIGS. 7 through 9.

Figure 7:
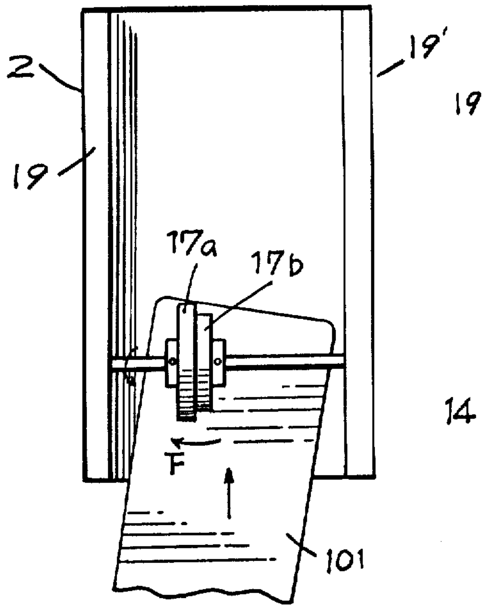
FIGS. 7 through 9 are plan views showing card transport conditions.
Figure 8:
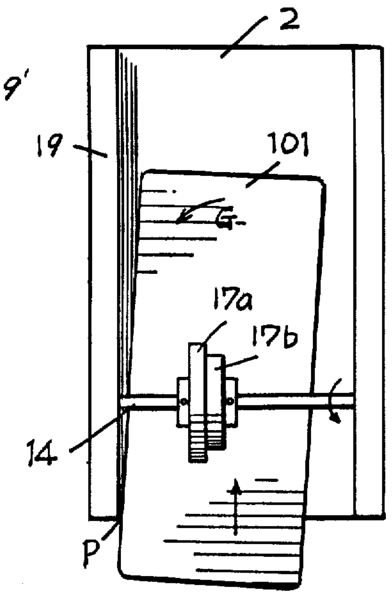

In FIG. 7, when the card 101 approaches to the drive roller 17, it engages between the drive roller 17 and the magnetic head 18 and at this time the drive roller 17 is compressed and deformed in a vertical direction because of presence of the card 19. The amount of deformation caused in the large-sized section 17*a* is larger than that in the small-sized section 17*b* and, as a consequence, the card 101 receives the rightward revolution moment in the direction of arrow F due to friction between the stair-shaped roller 17 and the card 101 together with the transport power in the direction of revolution of the roller 17, the rightward revolution moments of the card being centered on the contact of the card 101 with the roller 17. In this manner, the card 101 is advanced and somewhat rightward rotated at the beginning of card transport. Afterward, as shown in FIG. 8, the one side edge of the card 101 approaches to and contacts with the entrance end P of the guide 19 and then the rightward revolution of the card 101 is inhibited. Simultaneously, the card 101 receives on its path the leftward revolution moment G pivotted on the contact point P.

Figure 9:
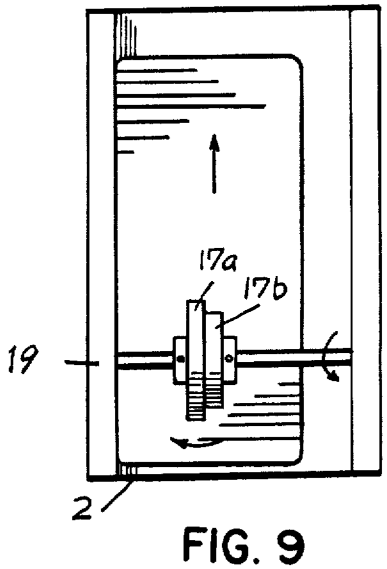

In this way, as shown in FIG. 9, the one side edge of the card 101 is precisely positioned along the guide plane and transported on the lower frame 2 and maintains such a position relation. During transport of the card 101, the leftward revolution moment always acts on the card 101 due to friction with the drive roller 17 but the leftward rotation of card 101 is limited by guide 19.

After that, where the drive roller 17 is rotated in the opposite direction, the distortion caused within the elastic member is reversed and thus the card 101 receives leftward revolution force centered on the position of contact of the card 101 with the roller 17*a* as it travels in the opposite direction. Since the edge of the card 101 has already been positioned along the guide 19 at this time, the card 101 is reversely advanced and ejected from the apparatus without rotating leftward. Generally speaking, the force for attracting the card to and positioning the card along the guide acts, depending upon the relative position of the large-sized section of the drive roller 17, without regard to the revolution direction of the drive roller.

Returning to FIGS. 3 through 5, a pair of screws 20, 21 are provided for adjusting the lower limit of the upper frame 1 with respect to the lower frame 2, serving as stoppers for preventing collision between the drive system on the upper frame 1 and the magnetic head 18, etc. on the lower frame 2. Another pair of screws 22, 23 are also provided for adjusting the upper limit of the upper frame 1. Pressure adjustment arrangements 24, 25 for the magnetic head 18 are respectively mounted on the both sides of the lower frame 2 wherein the head 18 is spring-supported against the weight thereof, the spring is extended between metal fittings on the lower frame 2 and the upper frame 1. Since the upper frame 1 is rotatably supported by the hinge shaft 3, force is impressed downward due to weight of the upper frame 1 and the drive systems thereon, namely, in the direction toward the magnetic head 18, while the magnetic head pressure adjustment arrangements 24, 25 provide upward force to the upper frame 1. The resulting force which approximates difference between downward and upward forces is so applied to the magnetic head 18 that the card 101 is forcedly pressed to the magnetic head 18. The range of movements of the upper frame 1 is defined by the upper limit adjustment members 22, 23 and the lower limit adjustment members 20, 21. Preferrably, by merely removing the upper limit adjustments 22, 23 and the head pressure adjustments 24, 25 from the apparatus after installation, there are no components preventing further upward movement of the upper frame 1 thereby allowing free revolution pivotted on the hinge shaft 3. Therefore, maintenance and repair of the drive system on the upper frame and the magnetic head and so forth on the lower frame can be performed through the expanded spacing therebetween.

Clear rollers 26, 29 coated with felt, nylon, brush are provided for removing the dust attached on both surfaces of the card 101. The clear roller 26 is rotatably supported on the upper frame 1 by a shaft 28 secured through a roller housing 27, while the other roller 29 is rotatably on the lower frame 2 supported adjacent to the above mentioned roller 26 or spaced away from the card advance path. Although the roller housing 27 serves as an upper guide for the one side edge 101, a special upper guide 31 may be deposited in a position on the rear of the upper frame 1 corresponding to the other side edge of the card 101 to facilitate insertion and removal of the card.

The following description is directed to a detection arrangement for detecting the position of the card and controlling the modes of card transport operations.

A first photo-electric switch 32 is shifted by a small distance (about 3mm) to the card entrance from the position where the drive roller 17 is very closely adjacent the magnetic head 18, which comprises a light source secured on the upper frame 1 and a light-sensing element secured in the corresponding position on the upper frame 1. Signals derived from the light-sensing element are fed to control unit so as to control the motor 4 and so on. A second photo-electric switch 33 containing a light source and a light-sensing element is placed backward with respect to the position where the drive roller 17 is very closely adjacent the magnetic head 18, namely, behind the first photo-electric switch 32. A support leg 34 of elastic material such as rubber is deposited on the magnetic credit card reader apparatus to protect the upper and lower frames 1, 2 from mechanical vibrations.

The functions of the magnetic credit card reader of the above described construction may be further understood by reference to the following description.

Where the card 101 is inserted along the guide 19 into the apparatus in a manner that its magnetic record surface 102 contacts the base plate, the card 101 is first transported between a pair of the clear rollers 26, 29 to remove dust on the card 101. When the card 101 is further advanced, it interrupts light beams from the light source within the first photo-electric switch 32 which are to be transmitted to the light-sensing element, and signals indicative of the insertion of the card 101 are introduced into the control unit. It follows that the motor 4 within the drive system commences rotating the drive roller 17 in such a direction that the card 101 is further led into the apparatus. Since the first photo-electric switch 32 is placed forward with respect to the installation position of the magnetic head 18, a rate of revolution of the drive roller 17 will equal a predetermined fixed one until the position where the drive roller 17 and the magnetic head 18 are placed is reached by the card 101.

After which, the edge portion of the card 101 contacts the drive roller 17 rotating at the fixed rate and at this time the upper frame 1 is rotated at the center of the hinge shaft 3 and pushed up in accordance with the thickness of the card 101. Thus the card 101 is pressed downward to the magnetic head 18 under the desired pressure. Such pressure force acting on the card 101 is adjusted by hanging the upper frame 1 and the drive system thereon with the use of tension springs attached to the head pressure adjustment arrangements 24, 25. This result in the substantially same pressure for both cases of thick card and thin card.

The card 101 is further advanced by revolution of the drive roller 17 and then interrupts the light beams within the second photo-electric switch 33. The card detection signals from the second photo-electric switch 33 function as control signals for causing the revolution of the motor 4 to be self-maintaining and thus keeping the revolution of the drive roller 17 in such a direction that the card 101 is led into the apparatus. The card 101 always travels in contact with the guide 19 and at this time, as previously described, the revolution moment required for contact with the guide 19 occurs due to the presence of the stair-shaped arrangement of the drive roller 17.

The operations for recording information on and reading information from the magnetic record surface 102 are not carried out while the card 101 is led into the apparatus and the magnetic head 18 contacts the magnetic record surface 102, but the magnetic head 18 becomes operative when the card 102 is moved in the opposite direction and ejected from the apparatus.

After the card 101 is completely inserted into the apparatus and the other end of the card 101 is passed through the first switch 32, the light reaches the light-sensing element which provides passage signals to the control unit. Upon appearance of such detection signal a reverse command is provided for the motor 4 and the motor 4 is reversed in the direction of revolution. The reverse revolution of the motor 4 provides the drive roller 17 with the driving power in such direction that the card 101 is led out from the apparatus. In this way, the movements of the card 101 are reversed in direction and the card 101 commences returning toward the entrance.

On the reverse course toward the card entrance, the card 101 passes over the photo-electric switch 32 and the motor 4 continues to rotate at the fixed rate. Accordingly, the card 101 is advanced to the card entrance. During such movements of the card 101, the magnetic head 18 reads information from the record surface 102 and writes information on the record surface 102.

At the point in time where the card 101 passes over the second photo-electric switch 33, the card passage signals are supplied to the control unit, with the results that the revolution of the motor 4 is stopped and the read and write operations are completed. The inertia force within the motor and the drive system allows further advancement of the card 101 and the card 17 is, therefore, stopped at the position away from the drive roller 17. When the one edge of the card 101 is spaced away from the position where the drive roller 17 and the magnetic head 18 are closely adjacent, the upper frame 1 which is held up is permitted to fall down.

We claim:

1. A magnetic card reader for reading information from a card containing a magnetic record thereon comprising:

magnetic head means for reading information from said card as said card traverses said head means;

a lower frame carrying said head means;

an upper frame carrying a drive roller means; and positioning means for placing said drive roller means in alignment with said magnetic head means and causing the direct engagement of said card between said drive roller means and said magnetic head means, said drive roller means including rollers disposed only on the opposite side of the card from said magnetic head means and in alignment with said head means when so positioned by said positioning means; and support means for said card on said lower frame consisting only of said magnetic head means and guide means for engaging the edges of said card;

whereby the only element which contacts said magnetic record is said magnetic head means, thus minimizing wear of said magnetic record.

2. A magnetic card reader as defined in claim 1 wherein said drive roller means comprises at least a pair of rollers mounted on a common axis; said rollers being resilient and of different respective diameters, whereby an edge of said card is urged against said guide means by said rollers to facilitate proper alignment of said magnetic record with said magnetic head means.

3. A magnetic card reader as defined in claim 1 further comprising a clear roller means for removing dust attached to the record area of the card, said clear roller being disposed on said lower frame, said clear roller consisting of a soft material which prevents damage to the magnetic record area.

4. A magnetic card reader as defined in claim 1 wherein said guide means is adjustably positioned with respect to a selected card edge.

5. A magnetic card reader as defined in claim 1 further comprising photodetection means for detecting the position of the card and generating output signals in response thereto, said output signals from the detection means having the function of controlling the card transport drive system.

* * * * *